UNITED STATES PATENT OFFICE.

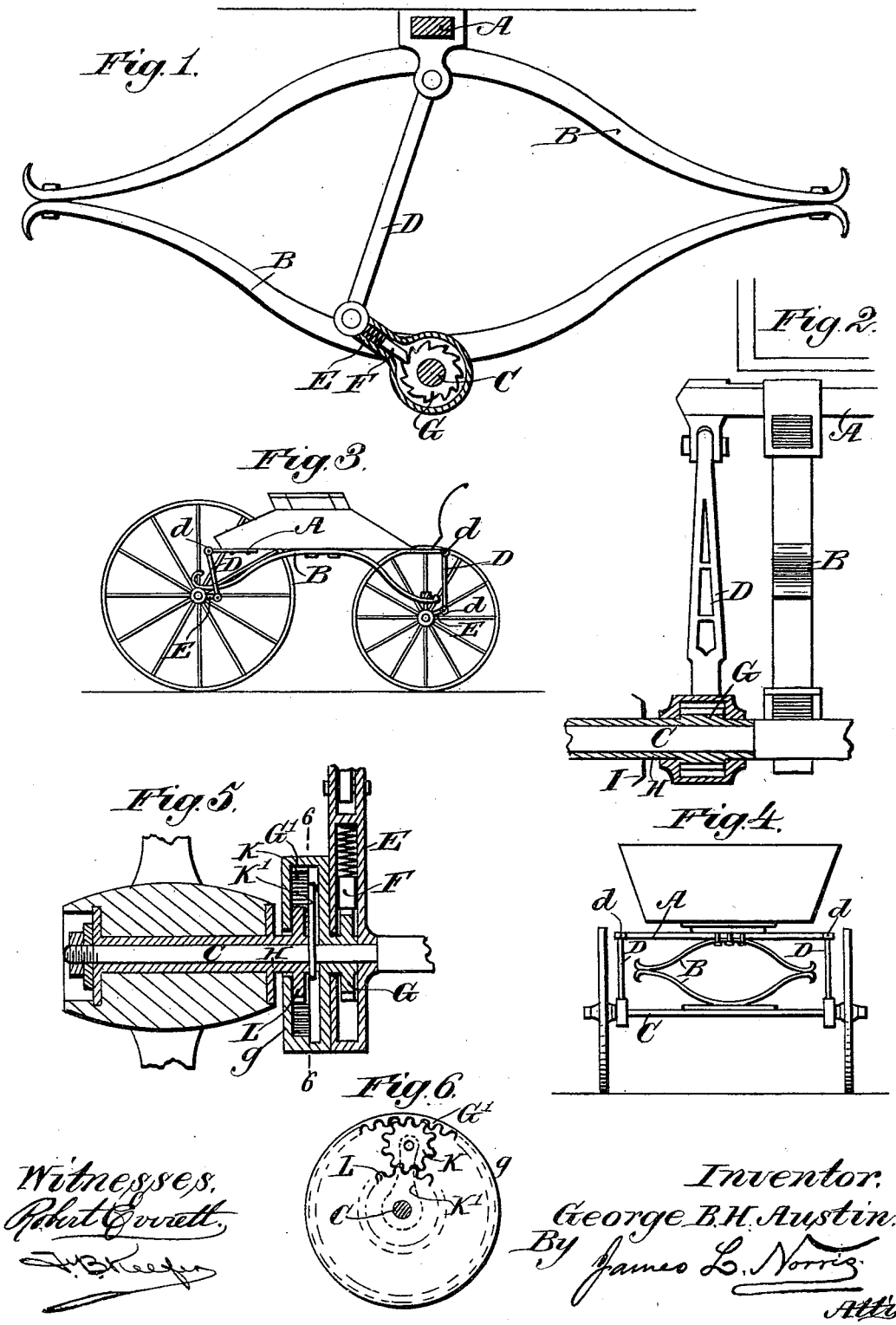

GEORGE BROUGHAM HUBERT AUSTIN, OF ARMADALE, VICTORIA.

MECHANISM FOR UTILIZING BUMPING OF VEHICLES FOR ASSISTING PROPULSION.

SPECIFICATION forming part of Letters Patent No. 622,101, dated March 28, 1899.

Application filed July 28, 1898. Serial No. 687,121. (No model.)

*To all whom it may concern:*

Be it known that I, GEORGE BROUGHAM HUBERT AUSTIN, architect, a subject of the Queen of Great Britain, residing at No. 60 Armadale road, Armadale, in the British Colony of Victoria, have invented Improved Mechanism for Utilizing the Bumping of Vehicles for Assisting in the Propulsion of Same, (for which I applied for a patent in Victoria, No. 15,283, on the 15th day of June, 1898,) of which the following is a specification.

This invention has been devised in order that the "bumping" of vehicles when traveling on rough roads or tracks may be utilized to assist in propelling same, thus reducing the tractive power required and thereby increasing the rapidity with which journeys may be made in spring-vehicles of various descriptions.

The precise manner of carrying my invention into practice will necessarily vary according to the various constructions of the vehicles to which it is to be applied. In general, however, it consists in connecting the body of a spring-vehicle to the hub or hubs or axle or axles (if the latter are revoluble) through the medium of rods, ratchets, clutches, or other similar contrivances, so that the vertical movement of such bodies will be communicated to the wheels and transposed from a vertical into a rotatory motion.

In order that my invention may be clearly understood, I will describe, by way of example, several adaptations of it, and to assist the description will refer to the accompanying drawings, in which—

Figure 1 is a diagrammatic view of part of a vehicle, illustrating the application thereto of a simple form of my invention. Fig. 2 is a sectional end elevation of Fig. 1. Fig. 3 is a side elevation of part of a buggy; and Fig. 4 is a front elevation of another style of vehicle, illustrating a further application of practically the same mechanism. Fig. 5 is a vertical central section illustrating a modification of the invention in which multiplying-gear is added to the mechanism to adapt it for use on fast-running vehicles. Fig. 6 is a vertical transverse section on line 6 6, Fig. 5.

Referring first to Figs. 1 and 2, A represents part of the under frame of a buggy or other vehicle, while B represents a pair of springs whereby said vehicle is supported upon the axle C. According to my invention the under frame A is connected by a rod D to the end of an arm E, carrying a spring pawl or ratchet F, engaging with the teeth of a ratchet-wheel G, secured upon an extension H of the hub I of the wheel, said arm E being pivotally supported or fulcrumed upon said extension H, so that it is free to turn around it when operated by the movement of the body of the vehicle. The effect of the downward movement of said body will obviously be to force down the arm E, and by reason of the ratchet F engaging with the teeth of the wheel G the wheel or wheels upon which the buggy or other vehicle is mounted will thereby be rotated, and thus the propulsion of the vehicle will be materially assisted. On the upward movement of the body of the vehicle the ratchet escapes over the teeth of the wheel G and is ready for the next downward movement.

The arrangement illustrated in Fig. 3 is practically the same as that shown in Figs. 1 and 2, except that it is shown as applied to both the front and back wheels.

As the fore-carriage of four-wheeled vehicles must necessarily be allowed a certain amount of play, the connecting-rod D may be formed with a ball-and-socket or other universal joint $d$ at each end to allow of such play. The bar A, secured to the fore-carriage, extends from side to side of the vehicle, as illustrated in Fig. 4.

If preferred, instead of driving the wheel or the axle carrying said wheel direct from the body of the vehicle, multiplying-gear can be arranged between the arm E and the hub of the wheel, as illustrated in Figs. 5 and 6, where E, as before, represents said arm, and F the spring-pawl or ratchet-gearing, with the teeth of a ratchet-wheel G, which is formed with a box or casing $g$, having an internal ring of teeth G', gearing with an idle pinion K, carried upon an arm K', fixed to the axle and gearing with a wheel L upon an extension H of the hub I. With this gear the rotatory movement of the wheel G will be transmitted to the smaller wheel L on the hub, and thus said hub will be driven at an increased rate of speed.

If preferred, in order to lessen the strain of the mechanism, buffers or springs may be provided in or around the connecting-rod D in order to take up any strain or jar to which it might otherwise be subjected, and instead of the spring pawl or ratchet F and ratchet-wheel G a silent pawl and wheel may be used, or in lieu thereof any of the well-known kinds of friction-clutch suitable for the purpose may be substituted.

Having now particularly described and ascertained the nature of my said invention and in what manner the same is to be performed, I declare that what I claim is—

1. In mechanism for utilizing the "bumping" of vehicles for assisting in the propulsion of the same, the combination with a rod pivotally suspended from the body of the vehicle, of a ratchet-wheel fast upon the axle, an arm pivotally supported from the hub of the wheel, and pivotally connected with said rod, a ball-and-socket connection between the upper end of the rod and the body of the vehicle, and a spring-pawl slidingly mounted within said arm to engage said ratchet, all substantially as and for the purpose specified.

2. The combination with the axle, a wheel having a hub with an extension, a ratchet secured upon said extension, an arm fulcrumed upon said extension, a spring-pawl mounted to slide within said arm to engage the ratchet, a rod pivotally connected with said arm and with the body of the vehicle, said arm being free to turn around the extension, a casing on the extension of the hub, and a multiplying-gear within said casing and operatively connected to give increased speed to the hub, as set forth.

GEORGE BROUGHAM HUBERT AUSTIN.

Witnesses:
  EDWARD WATERS,
  EDWARD WATERS, Junr.